US005880468A

United States Patent [19]
Irwin et al.

[11] Patent Number: 5,880,468
[45] Date of Patent: Mar. 9, 1999

[54] SUPERCONDUCTING TRANSITION-EDGE SENSOR

[75] Inventors: Kent D. Irwin; John M. Martinis, both of Boulder, Colo.

[73] Assignee: The United States of America as represented by the Secretary of Commerce, Washington, D.C.

[21] Appl. No.: 702,133

[22] Filed: Aug. 26, 1996

[51] Int. Cl.[6] ............................... G01K 7/16; G01K 7/36; G01K 11/30; G01T 7/00
[52] U.S. Cl. .......................... 250/336.2; 374/45; 374/176
[58] Field of Search .......................... 250/336.2; 374/45; 374/176; 505/847, 849

[56] References Cited

U.S. PATENT DOCUMENTS

| | | | |
|---|---|---|---|
| 5,090,819 | 2/1992 | Kapitulnik | 374/176 |
| 5,264,375 | 11/1993 | Bang et al. | |
| 5,634,718 | 6/1997 | Martinis et al. | 374/45 X |
| 5,641,961 | 6/1997 | Irwin et al. | 256/336.2 |

FOREIGN PATENT DOCUMENTS

| | | | |
|---|---|---|---|
| 2377643 | 9/1978 | France | 250/336.2 |
| 830149 | 5/1981 | U.S.S.R. | 374/176 |

OTHER PUBLICATIONS

Claassen, J.H. et al. (1991), "A contactless method for measurement of the critical current density and critical temperature of superconducting films," Rev. Sci. Instrum. 62(4):996–1004.

Frank, M. et al. (1996), "High–resolution X–ray detectors with high–speed Squid readout of superconducting tunnel junctions," Nucl. Instr. Methods Phys. Res. A 370:41–43.

Friedrich, S. et al. (1996), "Superconducting Nb–Ta–Al–AlOx–Al X–ray detectors with spatial resolution," Nucl. Instr. Methods Phys. Res. A 370:44–46.

Hauser, J.J. et al. (1964), "Superconductivity in Cu and Pt by Means of Superimposed Films with Lead," Phys. Rev. 136(3A):637–641.

Irwin, K.D. et al. (1992), "Tungsten thin films for use in cryogenic particle detectors," in *Low Temperature Detectors for Neutrinos and Bank Matter IV*, Booth, N. and Salmon, G. (eds.), Editions Frontiers, France, p. 209.

Irwin K.D. (1995), "An application of electrothermal feedback for high resolution cryogenic particle detection," Appl. Phys. Lett. 66(15):1998–2000.

Irwin, K.D. et al. (1995), "A Self–Biasing Cryogenic Particle Detector Utilizing Electrothermal Feedback and a Squid Readout," IEEE Trans. Appl. Superconductivity 5:2690–2693.

Irwin, K.D, et al. (1995), (Abstract Only), "A Hot Electron Microcalorimeter for X–ray Detection Using a Superconducting Transition Edge Sensor With Electrothermal Feedback," LTD 6—Sixth International Workshop on Low Temperature Detectors, Beatenberg/Interlaken, Switzerland, Aug. 28–Sep. 1, 1995, Abstract No. B024.

(List continued on next page.)

*Primary Examiner*—Edward J. Glick
*Attorney, Agent, or Firm*—Greenlee Winner and Sullivan, P.C.

[57] ABSTRACT

This invention provides a method and apparatus for particle detection utilizing an Al/normal-metal bilayer transition-edge sensor (TES) coupled with a particle absorber. The TES is maintained in the transition region where its properties are extremely sensitive to temperature. In the detector, the energy of an absorbed particle is converted to heat by the absorber and the transition from the bilayer's superconducting to normal state is used to sense the temperature rise. The transition temperature, $T_c$, of the bilayer can be reproducibly controlled as a function of the relative thicknesses and the total thickness of the superconducting and normal-metal layers. The range of available $T_c$'s extends from below 50 mK to above 1 K, allowing the detector to be tailored to the application. For x-ray detection the preferred $T_c$ is about 50–150 mK. The width of the transition edge can be less than 0.1 mK, which allows very high detector sensitivity.

29 Claims, 7 Drawing Sheets

OTHER PUBLICATIONS

Irwin, K.D. et al. (1996), "A hot–electron microcalorimeter for X–ray detection using a superconducting transition edge sensor with electrothermal feedback," Nucl. Instr. Methods Phys. Res. A 370:177–179.

McCammon, D. et al. (1991), "Cryogenic Microcalorimeters for High Resolution Spectroscopy: Current Status and Future Prospects," Nucl. Phys. A527:821c–824c.

Mosley, S.H. et al. (1984), "Thermal detectors as x–ray spectrometers," J. Appl. Phys. 56(5):1257–1262.

Nagel, U. et al. (1994), "Proximity Effect in Iridium–Gold Bilayers," J. Appl. Phys. 76:4262–4271.

Nahum, M. and Martinis, J.M. (1995), "Hot–electron microcalorimeters as high–resolution x–ray detectors," Appl. Phys. Lett. 66(23):3203–3205.

Peacock, A. et al. (1996), "Single optical photon detection with a superconducting tunnel junction," Nature 381:135–137.

Twerenbold, D. et al. (1996), "Detection of single macromolecules using a cryogenic particle detector coupled to a biopolymer mass spectrometer," Appl. Phys. Lett. 68:(24):3503–3505.

Welty, R.P. and Martinis, J.M. (1991), "A Series Array of DC Squids," IEEE Trans. on Magnetics 27(2):2924–2926.

SUPERCONDUCTING TRANSITION-EDGE SENSOR

FIELD OF THE INVENTION

This invention relates to particle detection, particularly x-ray detection, using an aluminum/normal-metal bilayer superconducting transition-edge sensor as a thermometer in a microcalorimeter.

BACKGROUND OF THE INVENTION

Detection of particles, including photons, molecules, electrons, ions and phonons, is essential to many industrial and research measurements. Although the present invention can be used for particle detection in general, it is particularly suited to x-ray detection, and the following discussion relates primarily to x-ray detection.

X-ray photon detectors usually directly detect other types of excitations that are generated by x-ray photons. In silicon and germanium based Energy Dispersive Spectroscopy (EDS) detectors, electron-hole pairs are generated by x-ray absorption events. Although EDS detectors are the most commonly used x-ray spectrometers for microanalysis, their energy resolution is limited to about 100 eV full width at half max (FWHM) by the counting statistics implied by the large size of the electron-hole pair excitation (a few electron volts (eV)). Superconductor/insulator/superconductor (SIS) tunnel junctions directly detect quasiparticles that are created by the incident x-rays and tunnel through the biased junction. As in semiconductor EDS detectors, the total current is indicative of the x-ray energy, but since the size of the quasiparticle excitation is much smaller (typically about a milli-electron volt (meV)), the theoretical energy resolution of SIS tunnel junction detectors implied by the carrier statistics is much better (a few eV FWHM.) Unfortunately, various effects tend to make the actual performance of SIS tunnel junctions significantly worse than the theoretical limit, and the best energy resolution that has been obtained with SIS tunnel junctions to date is 29 eV FWHM at 6 keV (Frank et al., Nucl. Inst. and Meth. A 370, 41 (1996)).

X-ray microcalorimeters instead convert the x-ray energy into heat in the form of hot-electrons or phonons, which can be a very efficient process. An x-ray microcalorimeter consists of an absorber to stop and thermalize incident x-rays and a thermometer to measure the resulting temperature rise. The first x-ray microcalorimeters used insulating or superconducting absorbers (for low heat capacity) and a semiconductor thermistor thermometer. While these achieve adequate energy resolution (7.1 eV FWHM at 6 keV), the response time is intrinsically slow. A recent microcalorimeter uses a normal-metal absorber and an NIS tunnel junction to measure the temperature rise (Nahum and Martinis, Appl. Phys. Lett. 66, 3203 (1991)). The response is fast but the energy resolution was limited to 18 eV FWHM at 6 keV by an unexpected noise source.

Superconducting transition-edge sensors have been proposed for use as a thermometer within an x-ray microcalorimeter (Irwin, Appl. Phys. Lett. 66, 1998 (1995), which is incorporated by reference herein in its entirety). The temperature of a superconducting film is held within the superconducting transition, and heat deposited in the film is measured via the strong temperature dependence of the film's electrical resistance in this region. For x-ray detection the optimum transition temperature is between about 50 and 150 mK. The choice of the $T_c$ within this range depends on the desired detector parameters. Superconducting tungsten films having $T_c$=70 mK have been used for x-ray detection (Irwin et al., IEEE Trans. Appl. Sup. 5, 2690 (1995)). For an elemental superconductor such as tungsten, the transition temperature tends to be a fixed property of the metal and is difficult to tune to suit specific applications. For alloys of superconductors with normal metals, the $T_c$ can be adjusted but the transition edge is not sharp and the alloys are not stable.

The transition temperature can also be adjusted via the proximity effect in superconductor/normal-metal bilayers. When a clean interface is made between a superconducting film and a normal metal film, and the films are thinner than their coherence lengths, the bilayer acts as a single superconducting film with a transition temperature suppressed from that of the bare superconductor. By varying the relative film thicknesses, the $T_c$ of the bilayer can be adjusted. Iridium/gold bilayers have been described for particle detection (Nagel et. al., J. Appl. Phys. 76, 4262 (1994)). The $T_c$ of elemental iridium is 112 mK, which is within the target range for x-ray detection. In Ir/Au bilayers, Nagel et. al. report $T_c$'s varying from 33 to 106 mK. However, the Ir/Au system is very difficult to reproducibly fabricate, it requires the substrate to be heated, it requires a very clean, high vacuum deposition system, and the transition temperature of such bilayers is limited to less than 112 mK. As shown in Table 1 and FIG. 3 of Nagel et al., the $T_c$ cannot be reliably predicted as a function of the layer thicknesses, and a transition is not even observed in some instances.

It is desirable to develop a bilayer system that has a larger tunable transition range, that can be more easily deposited, that can be deposited without heating the substrate, that can be deposited in a deposition system with only moderate vacuum (~1e-7 torr), that is more reliably reproducible, and that has sharper superconducting transitions. The present inventors attempted to fabricate Ir/Au bilayer transition-edge sensors, but were unsuccessful. Titanium/normal-metal bilayers were fabricated, but the $T_c$ was not reproducible, and the transition was broad. In searching for a suitable superconductor for use in a bilayer, aluminum was considered because of the ease of deposition of stable, low stress aluminum films with suitable hardness, low cost, and non-toxicity. It was, however, considered an unlikely candidate because the $T_c$ for aluminum (1.1 K) would need to be suppressed by more than an order of magnitude to cover the target range for x-ray detection (50–150 mK), which seemed incompatible with sharp, reproducible transitions. In addition, the $T_c$ of elemental aluminum is notoriously sensitive to contaminants and deposition conditions, making one think that the bilayer $T_c$ would be unpredictable. It was therefore an unexpected and surprising discovery that aluminum/normal-metal bilayers have reproducible transition temperatures, that the $T_c$ can be reduced by more than an order of magnitude, that the $T_c$ is tunable in a predictable fashion as a function of the thicknesses of the individual layers, and that the transition edge is extremely sharp.

SUMMARY OF THE INVENTION

This invention provides a method and apparatus for particle detection utilizing an Al/normal-metal bilayer transition-edge sensor (TES) coupled with a particle absorber. The TES is maintained in the transition region where its properties are extremely sensitive to temperature. In the detector, the energy of an absorbed particle is converted to heat by the absorber and the transition from the bilayer's superconducting to normal state is used to sense the temperature rise. The transition temperature, $T_c$, of the bilayer can be reproducibly controlled as a function of the relative thicknesses and the total thickness of the superconducting and normal-metal layers. The range of available $T_c$'s extends from below 50 mK to above 1 K, allowing the detector to be tailored to the application. For x-ray detection the preferred $T_c$ is about 50–150 mK. The width of the transition edge can be less than 0.1 mK, which allows very high detector sensitivity.

The detector can be used with many types of particles, including photons, molecules, electrons, ions and phonons. In a preferred embodiment the particles are x-ray photons. Depending on the type of particle, the absorber can be a normal metal, a superconductor, semiconductor, an insulator, the bilayer substrate, or the bilayer itself. In a preferred embodiment it is a normal metal. The bilayer normal metal can be any metal which is a normal conductor at the operating temperature. In a preferred embodiment the bilayer normal metal is silver.

The TES is maintained within the transition region. In a preferred embodiment electrothermal feedback (ETF) is utilized for temperature regulation. Alternatively the temperature can be maintained in the transition region by careful control of the cryogenic cooling. The transition from superconducting to normal conducting is measured to determine the energy deposited in the system by particles. The bilayer resistance can be monitored by voltage biasing the bilayer and measuring the current through the bilayer, for example with a superconducting quantum interference device (SQUID). The increase in bilayer resistance with temperature leads to a reduction in measured current. With an ETF-TES the energy deposited in the bilayer is approximately the integral of the reduction in feedback Joule heating, or the bias voltage multiplied by the integral of the change in measured current. Alternatively the bilayer resistance can be monitored by current biasing and measuring the voltage across the bilayer with a FET. There is a continuum of biasing conditions between voltage biasing and current biasing which can be used in the measurement. The superconducting transition can also be measured, for instance, via the change in the self- or mutual magnetic inductance of a coil or coils placed around the bilayer, or by a kinetic inductance measurement.

The particle sensor can optionally include a heat pulse injector for calibration. The heat pulse can be injected by applying a current pulse to the absorber or bilayer.

An x-ray detector of this invention was fabricated having an Al/Ag bilayer with a superconducting transition-edge near 100 mK. Electrothermal feedback was used to improve the energy resolution and shorten the thermal time constant, and a SQUID was used to measure the current through the bilayer. The detector was mounted on a scanning electron microscope (SEM) to measure the first SEM x-ray spectrum taken with a calorimeter. The energy of titanium $K_\alpha$ (4.5 keV) fluorescence x-rays was measured with resolution better than 10 eV FWHM. Using two other devices, the measured energy resolution for Joule heat pulses was 2.6 eV at 1 keV and 0.2 eV at 4 eV, the best reported for any calorimeter. An electrical noise equivalent power of $3 \times 10^{-18}$ W/$\sqrt{\text{Hz}}$ was also measured, one of the best results for any infrared bolometer.

BRIEF DESCRIPTION OF THE DRAWING

FIGS. 3a–c, is a superconductor/normal-metal bilayer (a) in plan view, (b) in cross section and (c) with a plurality of layers.

FIG. 6, comprising

FIG. 7, comprising FIG. 7a is both the ETF-TES microcalorimeter spectrum (curve 1) and a spectrum from a commercial, liquid-nitrogen cooled Si(Li) detector (curve 2). In FIG. 7b the Ti $K_\alpha$ microcalorimeter data (circles) is fit (line) to the theoretical Ti $K_{\alpha 1}$ and Ti $K_{\alpha 2}$ sublines broadened by 13.9 eV (dashes).

DETAILED DESCRIPTION OF THE PREFERRED EMBODIMENT

Figure 1:
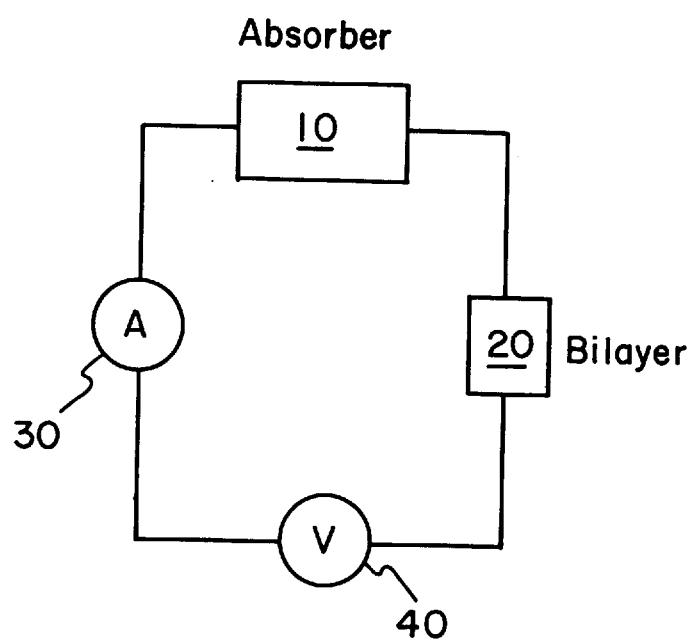
FIG. 1 a particle detector utilizing a bilayer transition-edge sensor.

The particle detector of this invention (FIG. 1) comprises particle absorber 10, superconducting/normal-metal bilayer 20, and a means for measuring superconducting transitions. In the illustrated embodiment the measuring means is bias voltage source 40 and current measuring device 30.

The bilayer has a superconducting state, a normal conducting state and a transition region therebetween. The conductivity state of the bilayer depends on the operating temperature, and the conductivity changes rapidly with temperature within the transition region. The transition region is characterized by a transition temperature, $T_c$, and by a transition width. The term transition region is used in lieu of transition edge to emphasize the fact that the transition is not instantaneous but rather requires a finite temperature range. In operation the bilayer is cooled to a temperature within or just below the transition region, wherein small changes in temperature produce large changes in bilayer properties.

Figure 2:
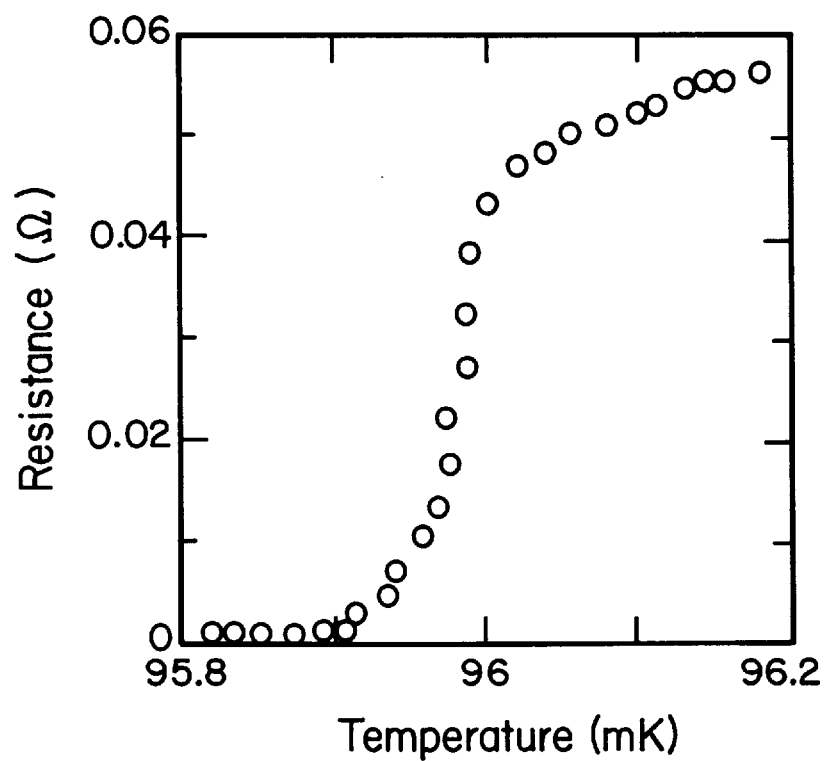
FIG. 2 shows the superconducting transition edge for an Al/Ag bilayer having an aluminum layer thickness of 439 Å and a silver layer thickness of 1045 Å.

The conductivity states of an aluminum/normal-metal bilayer are illustrated in FIG. 2. In this example, the normal-metal is silver with layer thickness 1045 Å, the aluminum layer thickness is 439 Å. In the superconducting state the resistance is essentially zero. In the normal conducting state the resistance is greater than about 0.05Ω and increases slowly with temperature. In the transition region the resistance increases rapidly with temperature. The transition temperature is about 96.0 mK and the transition width is about 0.1 mK.

Figure 3:
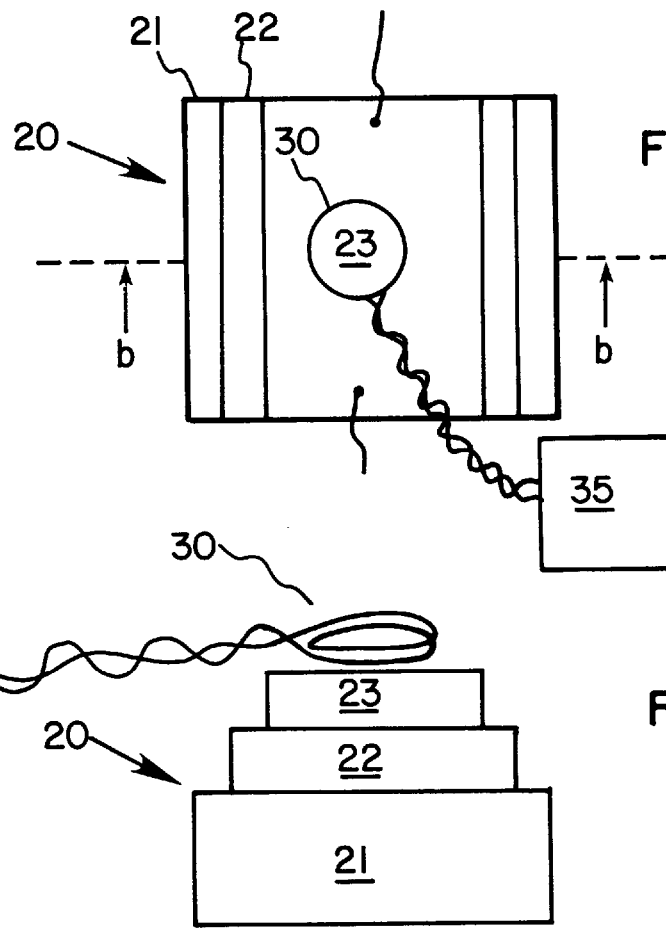
FIG. 3, comprising

The structure of bilayer 20 is illustrated in plan view in FIG. 3a and cross section in FIG. 3b. It comprises substrate 21, normal-conductor layer 22 and aluminum layer 23. FIG. 3a also shows coil 30 which can be placed around the bilayer, and inductance measuring electronics 35. In this embodiment, electrical contact is established on two ends of the bilayer. Because aluminum rapidly develops an oxide layer, it is preferred but not required that the normal metal be deposited first. An oxide layer about 10 Å thick develops on the exposed surface of layer 23 and then the film self passivates. The aluminum is not oxidized at the interface with normal-metal layer 22. To prevent an electrical short through elemental aluminum, it is preferred that the normal-metal layer extend beyond the aluminum layer on the substrate as shown. Alternatively, accurate masking during deposition can prevent the aluminum from extending beyond the normal metal, or the edge can be sharpened by etching following deposition.

Substrate 21 is a material which has lower conductivity than the bilayer so that does not create a conducting path around the bilayer. It is preferably a material which is not a source of impurities to the bilayer. In a preferred embodiment the substrate is crystalline silicon coated with a $SiN_x$ layer. In another preferred embodiment the substrate is a $SiN_x$ membrane having low thermal conductivity. The bilayer substrate can also serve as a substrate for the absorber and for measurement circuit connections.

Normal-metal layer 22 is made of any metal or metal alloy which is a normal conductor at the operating temperature of the sensor. It is preferred that the normal metal not rapidly form a contaminant layer, such as an oxide, so that there is no impurity at the aluminum interface. Preferred normal metals include gold, silver, copper, palladium, platinum, gold/copper alloys and palladium/gold alloys. An advantage of using metal alloys is their high sheet resistance, which is appropriate for some applications. The normal metal can also be a ferromagnetic material such as chromium, manganese, iron, cobalt and nickel, in which case the $T_c$ of the bilayer is suppressed well below the $T_c$ of aluminum with only a thin normal-metal layer. The normal metal can be a material such as tungsten which is a superconductor having a $T_c$ below the operating temperature of the sensor, but is a normal conductor at the operating temperature.

Figure 4:
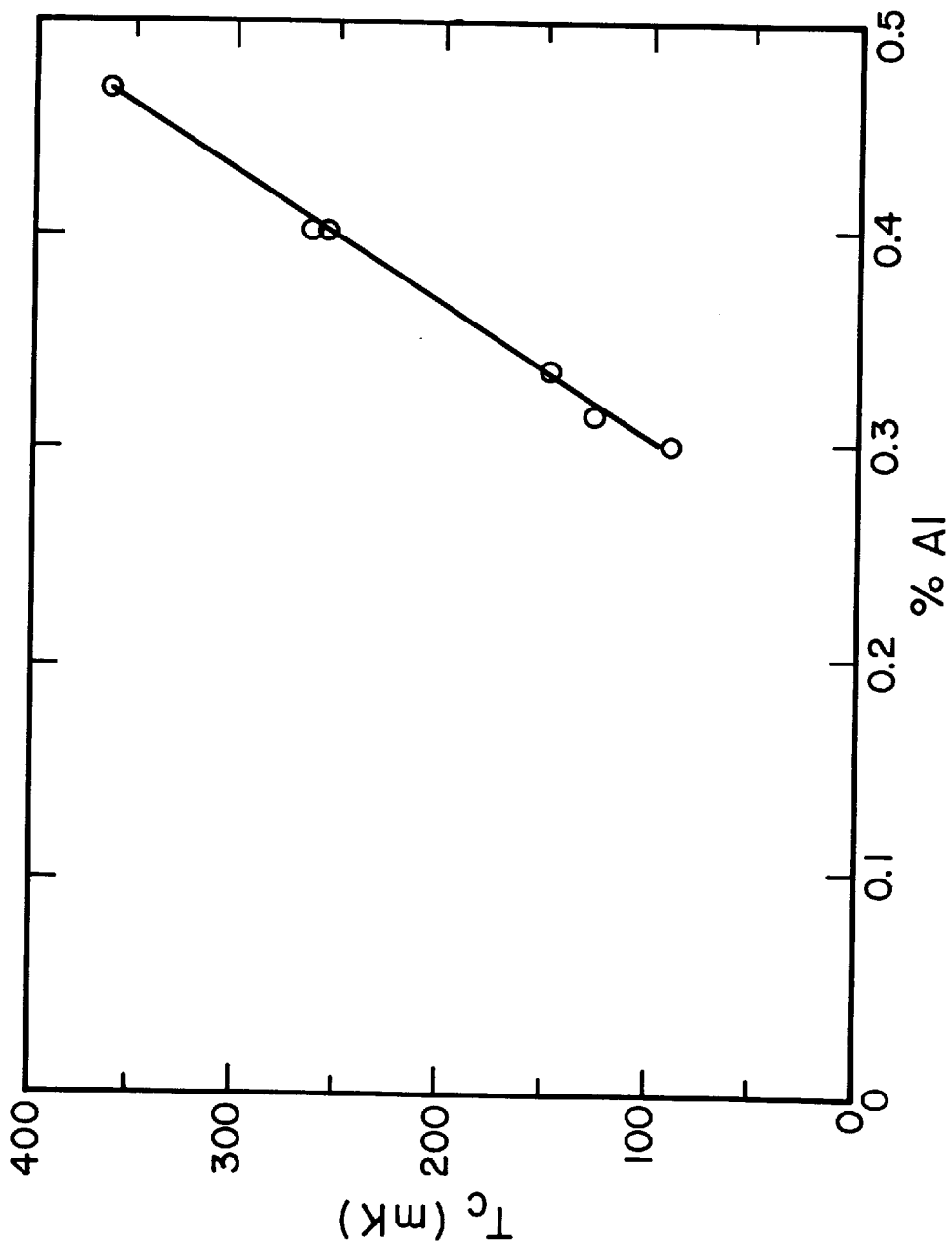
FIG. 4 shows the increase in the $T_c$ with increased percent aluminum for Al/Ag bilayers having a total thickness of 1500 Å.

The transition temperature of the bilayer is a function of the normal metal employed, of the relative thickness of the normal metal and superconductor layers, and of the total thickness of the two layers. The change in the $T_c$ with percentage of aluminum is shown in FIG. 4. The normal metal is silver and the total thickness is fixed at about 1500 Å. Although $T_c \approx 1.2$ K for elemental aluminum, aluminum/normal-metal bilayers can have $T_c < 50$ mK. The graph is linear in the region shown and becomes curved at higher temperatures. The lines for lesser and greater total thickness (not shown) fall to the right and to the left of this line, respectively. The clear and reproducible correlation makes it possible to reliably fabricate aluminum/normal-metal bilayers with a preselected $T_c$. The preferred $T_c$ depends on the application, and it ranges from about 50–150 mK for x-rays to about 1 K for large ions. The maximum $T_c$ for the bilayer is the $T_c$ for aluminum, which is about 1.2 K. When aluminum is impure, for example from oxygen contamination, the $T_c$ can be higher. Transition temperatures as high as 5.7 K have been reported. Thus the maximum bilayer $T_c$ may be higher than 1.2 K. A consideration in choosing the $T_c$ is the trade-off between increased speed at higher $T_c$ and increased resolution at lower $T_c$. The available cryogenic technologies are another consideration.

The thickness of the layers is chosen primarily to provide the desired $T_c$. There are also engineering considerations associated with the specific means of measuring the superconducting transition which are discussed later. In general, each layer is preferably at least thick enough to create a continuous film rather than metal islands. For electrical measurements this continuity is required in order to provide a continuous current path. Aluminum can form a continuous film at least down to 50 Å thickness. For electrical measurements, the maximum thickness of the aluminum layer is the coherence length of aluminum so that the proximity effect acts throughout the aluminum layer. The coherence length is an inverse function of the $T_c$. At $T_c=100$ mK, the coherence length is about 20 $\mu$m. For some applications layers with graded thicknesses can be used.

The bilayer film can be fabricated by e-beam evaporation using shadow masks to define the deposition area. It is preferred that both layers are fabricated without breaking the vacuum to prevent the formation of a contamination layer. It is also possible to break vacuum and then etch the contaminant layer in situ. The layer thickness can be monitored during deposition with a quartz crystal which is preferably placed near the substrate. Details of e-beam evaporation and of alternative deposition techniques, such as sputtering, are known to those skilled in the art.

The bilayer is coupled with a means for measuring superconducting transitions within the transition region between superconducting and normal conducting. The bilayer is maintained at a temperature in or just below the transition region, and increases in temperature produce transitions in the bilayer toward the normal conducting state. The thermally induced transition can place the bilayer in the normal-conducting state (operation in saturation) or the bilayer can remain within the transition region. The phrase superconducting transitions within the transition region includes transitions which start and/or end outside of the region; the transitions must occur at least partially within the transition region. Ultimately the heat flows to a heat sink such as the bilayer substrate.

Superconducting transitions can be measured electrically by measuring the bilayer resistance. The bilayer can be voltage biased and the current through the bilayer is measured, preferably with a SQUID. A series-array SQUID can be used, as described in Welty et al., IEEE Trans. Magn. 27, 2924 (1991), which is incorporated by reference herein in its entirety. In a preferred embodiment the bilayer temperature is maintain via electrothermal feedback and the transition is measure by the reduction in Joule heating (Irwin et al., Nucl. Inst. and Meth. A 370, 177 (1996), which is incorporated by reference herein in its entirety). Negative electrothermal feedback results when a superconducting film is voltage-biased and the substrate is cooled to well below the superconducting transition. This feedback produces a self-biasing effect which causes the temperature of the film to remain within its transition region. As the film cools, its resistance drops, and the Joule heating ($V^2/R$) in the film increases. A stable equilibrium is established when the resistance is reduced to the point where the Joule heating matches the heat flowing to the substrate.

Electrothermal feedback also reduces the thermal time constant of the sensor. When a particle interacts with the absorber it is rapidly thermalized, raising the temperature of the absorber and the bilayer. The rise in temperature increases the film resistance and decreases the Joule heating. This reduction in heating compensates for heat from the particle absorption with an effective time constant which is shorter than the intrinsic thermal time constant of the system. The effective time constant with electrothermal feedback is $\tau=\tau_0/(1+\alpha/n)$, where $\tau_0=C/G$ is the thermal time constant in the absence of electrothermal feedback (the heat capacity C of the bilayer and absorber divided by the thermal conductance G to the heat sink), $\alpha=dlogR/dlogT$ is the logarithmic sensitivity, a dimensionless measure of the sharpness of the superconducting transition, and n=dlogP/dlogT is the logarithmic derivative of the bias power with respect to detector temperature. Since superconducting films can be fabricated with $\alpha \approx 1000$, and n is typically 3–5, this response time can be shortened by more than two orders of magnitude. When the effective time constant is short compared to the intrinsic time constant, the detector operates in the extreme electrothermal feedback regime, where substantially all of the heat is removed by a reduction in Joule heating rather than by an increase in the heat flow to the substrate. The x-ray energy deposited in the film is then the integral of the reduction in feedback Joule heating, or the bias voltage multiplied by the integral of the change in the bias current.

The fundamental limit of the energy resolution of the ETF-TES, including the Johnson noise of the film and thermodynamic temperature fluctuations between the detector and the heat bath, is $$\Delta E_{FWHM} = 2.35 \sqrt{kT^2C} \sqrt{\frac{4}{\alpha}}, \quad (1)$$

which is lower than the FWHM thermodynamic energy fluctuations in the detector by a factor of about $2.5/\sqrt{\alpha}$. Since $\alpha$ can be greater than 1000, this limit provides a generous heat capacity budget. Thus, while silicon thermistor microcalorimeters are restricted to insulating and superconducting absorbers with very small heat capacities, the ETF-TES microcalorimeter can use large normal-metal absorbers with heat capacities about two orders of magnitude larger. For example, for a gold absorber of dimensions 500 $\mu$m×500 $\mu$m×5 $\mu$m (which has a quantum efficiency of 99% for 6 keV x-rays), with $\alpha$=1000 and T=100 mK, the fundamental limit on the resolution is 1.3 eV FWHM.

The use of SQUID measurement of the current presents engineering considerations which govern the preferred dimensions of the bilayer. The resistance of the bilayer at the operating temperature is a function not only of the bilayer materials and the ratio of the thicknesses, but also of the total thickness, length and width of the bilayer. With SQUID measurement the electrical time constant is inversely proportional to the bilayer resistance. Therefore a high sheet resistance (thin bilayer) provides a fast electrical response. On the other hand, a low sheet resistance (thick bilayer) provides a fast thermal equilibration and higher detector responsivity. There is a trade-off between these factors in optimizing the response time.

One way to reduce the $T_c$ to the desired range while maintaining a thin (high sheet resistance) bilayer is to use a ferroelectric normal metal. For example, a chromium layer as thin as 5–10 Å can significantly reduce the $T_c$. Another method is to use a stack of superconductor and normal-metal layers, as shown in FIG. 3c. This TES comprises the bilayer formed by normal-metal layer 22 and superconductor layer 23 and further comprises additional normal-metal layer 24 and superconductor layer 25. Still more layers can be added, and the stack can have an even number of paired layers or an odd number of layers. For multilayer stack deposition it is preferred that the deposition conditions do no allow formation of an oxide layer on the aluminum layers. The stack can start with either an aluminum or normal-metal layer and then the layers alternate between aluminum and normal metal. If the total thickness is fixed and the aluminum percentage is fixed, then each layer in the multilayer stack must be thinner than with just two layers, resulting in decreased electron mean free path and increased sheet resistance. This stacking provides independent control of the $T_c$ and sheet resistance for a given pair of materials.

Another consideration in choosing the layer thickness is the critical current, $I_c$, above which the bilayer no longer has a superconducting state. A thicker film has a high critical current and a thinner film has a lower critical current. The fastest time in which the deposited energy can be removed from the bilayer by ETF equals $E/P_J$ where E is the deposited energy and $P_J$=IV. Therefore a larger $I_c$ can allow a faster response time. For x-ray detection the critical current can become a limiting factor because the large amount of energy deposited produces a high current in the bilayer.

The width and length of the bilayer can also be optimized for the ETF-TES. Increasing the width of the bilayer increases critical current proportionally, which is particularly useful for x-ray detection. On the other hand, the diffusion time increases with the square of the width so increasing the bilayer width increases the thermal equilibration time. The resistance of the bilayer increases with decreased width. For current measurement with a SQUID, the electrical response is faster for greater resistance, but for FET measurement the electrical response is slower for greater resistance. Similarly, increasing the length of the bilayer increases the diffusion time and the total resistance. These factors are considered in designing the dimensions of the bilayer.

The $T_c$ can be tailored to the means for detecting superconducting transitions. For the ETF-TES several factors improve with decreasing temperature. As shown by Eq. 1, the theoretical energy resolution improves both with decreased temperature and with decreased heat capacity, which in turn decreases in proportion to temperature. In addition, the transition width of the superconducting transition can be narrower at a lower $T_c$, which leads to increased sensitivity. On the other hand, refrigeration requirements are more difficult for decreased operating temperatures. With current adiabatic demagnetization refrigeration (ADR) an operating temperature of 50 mK is readily achieved. For x-ray detection in an SEM optimal performance is achieved with a $T_c$ about 50–150 mK. For particles such as large ions, the detection sensitivity is adequate at high operating temperatures and the $T_c$ can be as high as about 1 K.

As alternatives to current measurement with voltage biasing, other means for measuring the superconducting transition can be employed. The bilayer can be current biased and its voltage measured with a FET. The biasing condition can fall between voltage and current biasing. Voltage biasing is often achieved by current biasing a parallel arrangement of (1) a shunt resistor having much smaller resistance than the TES at the bias point and (2) a bilayer and a SQUID in series. If the shunt resistance is not small compared to the bilayer resistance, then bias condition lies between a voltage and a current bias. As the voltage across the bilayer changes there is a continuum of biasing conditions between voltage biasing and current biasing. The design of biasing and measuring circuits is known to those skilled in the art.

The superconducting transition can also be measured, for instance, via the change in the self- or mutual magnetic inductance of a coil or coils placed around the bilayer, or by a kinetic inductance measurement. For measurements with coils, electrical contact to the bilayer is not required. In this case it is also not required that the layers be continuous, but continuous film are preferred to islands for increased transition edge uniformity.

Bilayer 20 is thermally coupled to particle absorber 10. The coupling can also be electrical. The absorber is made of a material which absorbs energy from incident particles and converts it to thermal energy. It need not absorb the particles themselves, for example when the particles are ions or molecules. The absorber can be a normal metal, superconductor, semiconductor or insulator. Because a normal-metal absorber has no long-lived electron-hole pair or quasiparticle excitations, it can have more efficient thermalization properties than an insulator or superconductor. In addition, it can be designed with short diffusion times, making it possible to build a faster detector.

Figure 5:
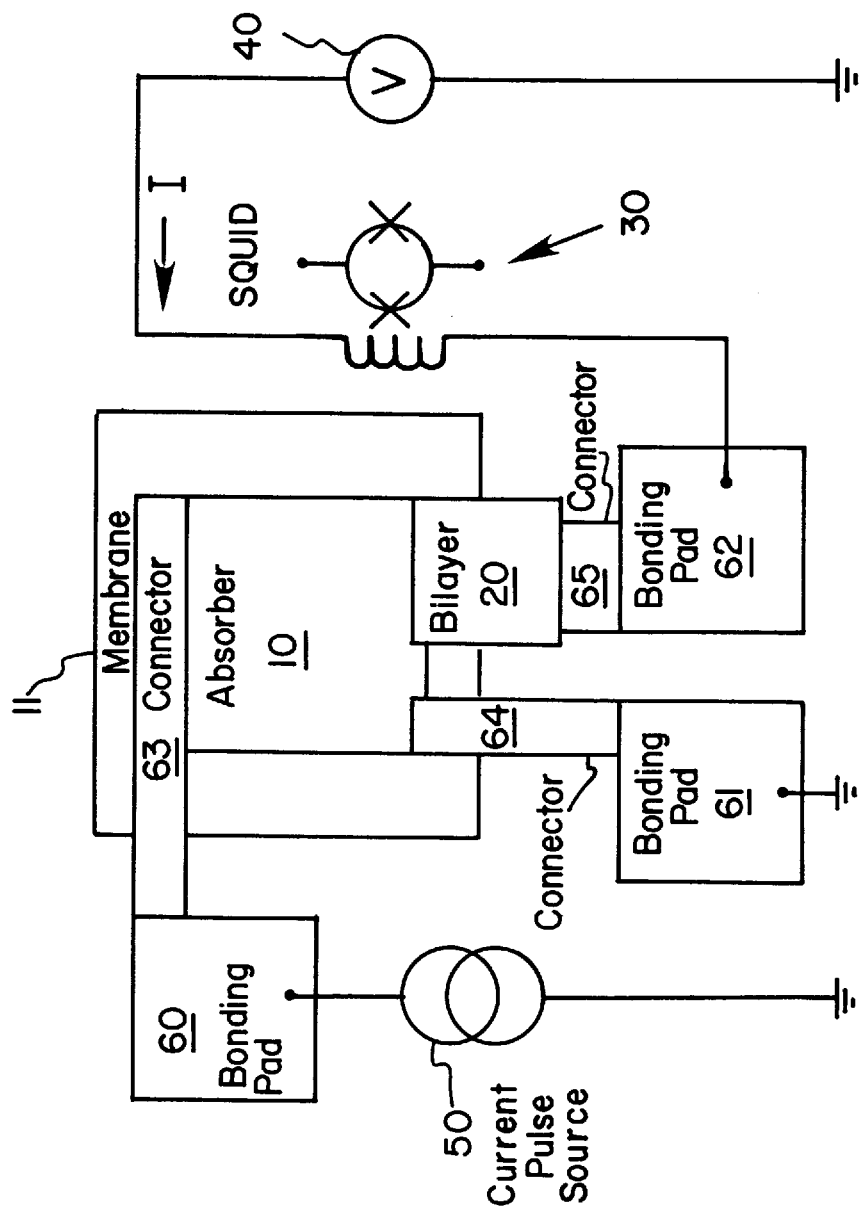
FIG. 5 is a particle detector employing an electrothermal feedback transition edge sensor and having an optional heat pulse injector.

To improve the thermalization of the x-rays in the absorber and to reduce the thermal coupling between the electrons in the absorber and the absorber substrate, the absorber can be deposited on a freely suspended membrane, as shown in FIG. 5. In this embodiment absorber 10 is suspended on membrane 11, which can be a $SiN_x$ membrane.

With this construction, most non-thermal phonons escaping from the absorber reflect off the silicon nitride/vacuum interface and reenter the normal metal where they are efficiently thermalized. A $SiN_x$ membrane can be formed by growing a $SiN_x$ layer (which can be less than 0.1 μm thick) on a silicon wafer and removing the silicon from a portion of the wafer by etching. In the illustrated embodiment half of the bilayer is also on the membrane and the other half is on $SiN_x$ coated silicon. Because of the small thermal conductivity, placing the bilayer on a $SiN_x$ membrane increases the thermal time constant of the sensor. Depending on the sensor design, the absorber, the bilayer, or both can be on the $SiN_x$ membrane.

In this embodiment, the absorber is in thermal and electrical contact with bilayer 20. Electrical contact to the absorber and bilayer is made via aluminum bonding pads 61 and 62 and aluminum connections 64 and 65. In the illustrated embodiment, the bilayer, the absorber and the aluminum connections share the same substrate. The superconducting transition is measured using bias voltage source 40 and inductance coil and SQUID 30.

A heat pulse injector is also illustrated in FIG. 5. Current pulse source 50 is electrically connected to the absorber via aluminum bonding pad 60 and aluminum connector 63. The current pulse creates a fast heat pulse by dissipating Joule power in the absorber and/or bilayer. The injection of heat pulses allows calibration of the particle detector and provides a means to measure the energy resolution achievable in the absence of variations in thermalization and heat diffusion from incident particles.

Figure 6A:
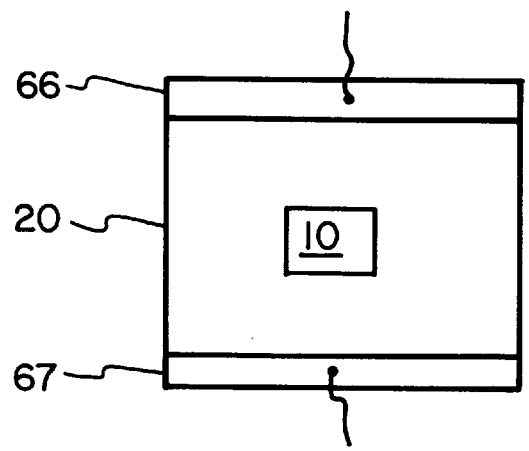
FIGS. 6a–b, is (a) an absorber positioned on a bilayer and (b) a meandering bilayer which also functions as an absorber.

In an alternative embodiment absorber 10 is positioned on top of bilayer 20, as shown in FIG. 6a. Aluminum films 66 and 67 provide electrical contact to the bilayer. This configuration is particularly suited to x-ray detection because the bilayer can have a high critical current. The absorber is placed in the center so that heat from the absorber diffuses throughout the bilayer quickly.

In some embodiments the bilayer substrate can be the absorber. Insulating and semiconducting substrates, such as Si and Ge, are particularly suited to be absorbers. In other embodiments the bilayer itself can function as the absorber. The absorber has the additional function of delocalizing the heat, so when the bilayer itself is used for the absorber the current pulse shape can be distorted due to the localized heating. For x-ray detection the absorber needs to be several microns thick to efficiently absorb x-rays up to 10 keV, which is considerably thicker than the typical bilayer. Visible photons can be absorbed within 50–100 Å, so in this case the bilayer can more easily serve as the absorber. The bilayer can also be the absorber for molecules, ions and phonons.

Figure 6B:
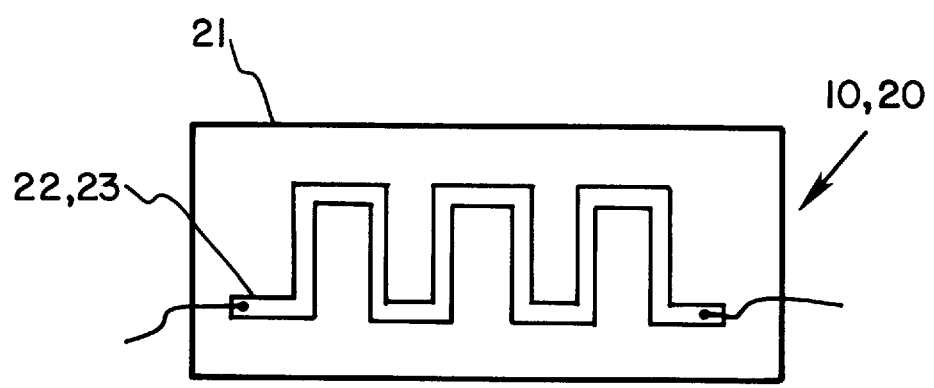

An embodiment wherein the bilayer is the absorber is illustrated in FIG. 6b, wherein bilayer 20 is also absorber 10. This embodiment also illustrates a bilayer having a meandering shape. The meandering path provides a larger surface area while maintaining a narrow bilayer width (typically less than 5 μm). One example of a meandering path is illustrated; others can be employed. With a narrow bilayer the heat from an incident particle need only diffuse a short distance in order to cause a superconducting transition across the width of the bilayer. This configuration provides a high speed sensor. The sensor has a high impedance which can be useful for impedance matching with a FET in the measurement circuit. The preferred width of the bilayer depends on the energy of the particles, on the desired response time, and on the desired impedance.

The particle sensor can also be used as a bolometer for infrared photons. In a bolometer the total incident power is measured as opposed to a microcalorimeter which responds to individual particles.

The particle sensor can also be used to detect ions, especially large ions. In time-of-flight mass spectroscopy of large ions such as biopolymers there is a need for particle detectors which are efficient even for high masses. For large ion detection the narrow meandering bilayer is especially suitable because it provides high speed.

The transition edge sensor of this invention can be used as a thermometer to measure the temperature of an object. The TES is thermally coupled with the object. The particle detector is a special case wherein the object is a particle absorber. The thermometer is well adapted to accurate temperature measurement because it is particularly sensitive to changes in temperature. Electrothermal feedback within the thermometer can be used to regulate the bilayer temperature and thereby regulate the temperature of an object thermally coupled with the bilayer.

For a thermometer, it may be desired to have a broader transition width so that there is a greater operating range. To provide the desired R vs T profile, the aluminum and/or normal-metal layer can have a graded thickness. The R vs T profile can also be designed with, for example, a broad transition region which has within it a portion having a sharper transition edge. This profile gives regulation over a broad range with precise temperature control within a target range. Similarly other profiles can be designed for specific applications.

The particle detector of the invention is further illustrated by the following working examples which are summarized in Table 1. The fabrication method for the Al/normal-metal bilayers is as follows. Each Al/Ag bilayer was deposited onto a 1 cm×1 cm silicon chip with 0.5 μm silicon nitride film on the surface. The chip was placed into a vacuum chamber for evaporative deposition. Deposition was done through a silicon micromachined shadow mask with several different apertures. The mask was mounted on an x-y adjustable stage to make processing faster since no photolithography was needed. Usually the aperture in the shadow mask used for the normal metal deposition was slightly wider than that used for the aluminum film deposition, in order to reduce the probability that a thin strip of aluminum would be deposited with no underlying normal metal. Such a thin strip would have a high $T_c$, and electrically short out the superconducting transition of the bilayer.

An Edwards/Temescal electron gun was used to evaporate the source material. The source material was selected from a rotatable 6 sample hearth, so that the normal metal and aluminum bilayers could be deposited sequentially without breaking vacuum. 99.999% pure slugs of aluminum and the normal metal were used. The aluminum slugs were placed directly in the copper hearth. The normal metal slugs were usually placed in a graphite hearth shield which was then placed in the hearth.

The normal metal was typically deposited first since the aluminum tends to form an oxide layer quickly, which would perturb the proximity effect. The chamber was pumped down to $1.2\times10^{-7}$ torr before evaporation began. The source hearth was rotated to put the normal metal source in position for evaporation. The shadow mask was adjusted to the proper position for the normal metal deposition. The normal metal was evaporated first, at a typical rate of about 2 nm/sec. During the deposition, the pressure in the chamber typically rose to about $1\times10^{-6}$ torr. The thickness of the deposition was measured using a quartz crystal and an Inficon IC/5 crystal thickness monitor. In order to make measurements more accurate, the quartz crystal was placed on a rotating arm, and rotated into a position adjacent to the silicon chip before evaporation. The evaporation was begun with a metal shutter in between the source and the silicon chip until a constant deposition rate was established. The shutter was then moved out of position until the crystal thickness monitor registered the target material thickness. The shutter was then closed. Opening and closing of the shutter was controlled by the Inficon IC/5 for greater accuracy.

After the normal metal was evaporated, the electron beam was turned off, and the hearth was rotated to place the aluminum source into position for evaporation. The shadow mask was then moved to the appropriate position for the aluminum deposition. About one minute typically elapsed between the end of the silver deposition and the beginning of the aluminum deposition. This time was kept short so as to minimize the formation of a contaminant layer on the silver before the aluminum was deposited. Aluminum deposition also occurred at a rate of about 2 nm/sec. Other deposition details were also the same as described for the normal metal deposition.

After the fabrication of the bilayer was complete, the sample was allowed to cool for about ten minutes. A small amount of oxygen (about 1 torr) was then injected into the chamber. This exposure to clean oxygen led to the formation of a high quality, stable oxide on the aluminum film, which may improve the long term stability of the bilayer. The oxygen was allowed to remain in the chamber for five minutes. The chamber was then vented to air and the chip was removed.

For measurement, the bilayers were used in the particle detector configuration of FIG. 5. The current through the bilayers was measured using a series-array SQUID amplifier which has now noise and bandwidth greater than 1 MHz. The amplified SQUID current pulses were digitized before analysis

EXAMPLE 1

Detector 1 had a Ag absorber of area 250 $\mu$m×250 $\mu$m and thickness 2 $\mu$m, a TES normal resistance of about 85 m$\Omega$, and a $T_c$ of about 85 mK. The detector was cooled in an adiabatic demagnetization refrigerator (ADR). The compact, portable ADR uses two pills to cool from a 4 K liquid helium bath to about 50 mK without pumps, and has a hold time of greater than 12 hours at 100 mK. The detector was situated at the end of an ADR cold finger which was inserted into a commercial scanning electron microscope (SEM). The detector, which was 3 cm from the sample in the SEM, was in a separate vacuum space with a thin x-ray window. A titanium foil sample in the SEM was excited using an electron beam, producing fluorescent x-rays that passed through the x-ray window and were absorbed in the detector. Pulses from the Ti $K_\alpha$ (4.511 keV) and $K_\beta$ (4.931 keV) lines were detected.

Pulse risetimes, typically about 10 $\mu$s, were determined by the SQUID input and stray inductances divided by the bias resistance of the TES. Pulses had characteristic fall times of 480 $\mu$s with electrothermal feedback. When the operating temperature of the cold finger was within the superconducting transition (where there is little electrothermal feedback) a characteristic fall time of about 5 ms was observed. Electrothermal feedback thus shortened the pulse by about an order of magnitude. The magnitude of the feedback was limited by the critical current of the TES. Even without increasing the existing amount of electrothermal feedback, it should be possible to reduce the pulse duration to less than 100 $\mu$s without loss of resolution by increasing the value of the thermal conductance between the detector and the heat sink.

Figure 7A:
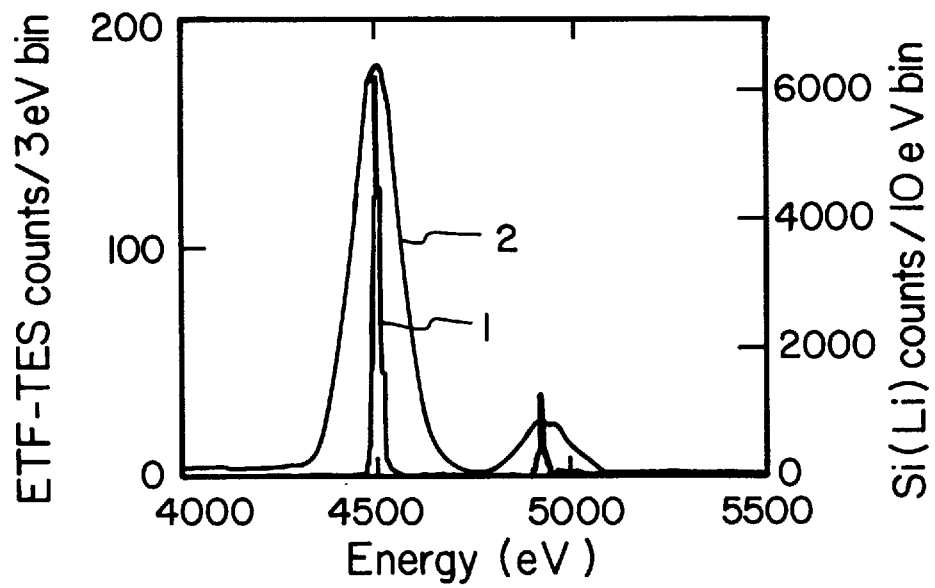
FIGS. 7a–b, is a Ti $K_\alpha$ and $K_\beta$ x-ray spectrum from a ETF-TES particle detector connected to an SEM.
Figure 7B:
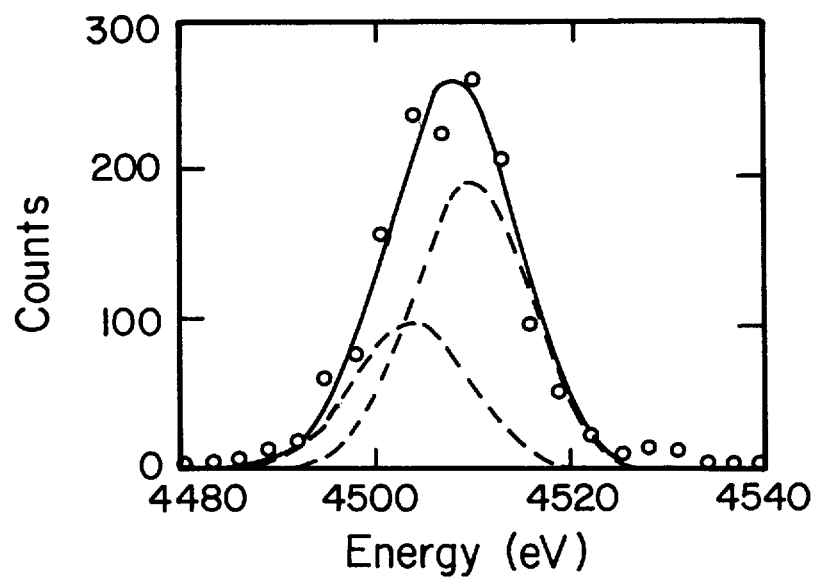

The digitized x-ray pulses were analyzed using the optimal filter, resulting in a sharp x-ray spectrum (curve 1, FIG. 7a). Also shown is a spectrum obtained using a liquid-nitrogen-cooled commercial Si(Li) detector which was also installed on the SEM (curve 2). The observed Ti $K_\alpha$ line from the ETF-TES particle detector (circles) was fit (line) to the theoretical Ti $K_{\alpha 1}$ and Ti $K_{\alpha 2}$ line substructure (dashes) using a least-squares method (FIG. 7b). For a detector resolution of 13.9 eV FWHM, the observed at theoretical lines agree. This resolution is about an order of magnitude better than the commercial Si(Li) detector. The best energy resolution that has been reported for any calorimeter is 7.1 eV FWHM for the 5.9 keV Mn $K_\alpha$ line using a silicon thermistor microcalorimeter. The present result was achieved using an absorber with a heat capacity 10 times larger, and with pulses 10 times faster.

The energy resolution of this detector was limited by SQUID noise which was measured to be 17 pA/$\sqrt{Hz}$. The x-ray resolution is expected to improve by a factor of 2 by using a SQUID with lower noise in the ADR.

EXAMPLE 2

Detector 2 had a Ag absorber of area 250 $\mu$m×250 $\mu$m and thickness 0.5 $\mu$m, a TES normal resistance of about 1$\Omega$, and a $T_c$ of about 80 mK. It was cooled in a dilution refrigerator which had a SQUID with a noise of 2 pA/$\sqrt{Hz}$. Heat pulses of 1 keV were injected into the absorber by Joule heating. The resulting SQUID current pulses were analyzed using the optimal filter. Since this device was operated with less electrothermal feedback, pulses had longer time constants of 800 $\mu$s. Pulse energy resolution was 2.6 eV FWHM at 1 keV, an energy which caused temperature excursions to near the limit of the detector's linear response range.

EXAMPLE 3

Detector 3 was fabricated to determine the resolution attainable with small detector volumes. In this device, the Al/Ag bilayer itself was used as the absorber, with an area of 70 $\mu$m×100 $\mu$m and 50 nm thickness. The normal resistance of the bilayer was about 1 $\Omega$, and the $T_c$ was about 85 mK. When heat pulses of energy 4 eV were injected, the characteristic pulse time constant was 8 $\mu$s (due to the small absorber heat capacity), and the energy resolution was better than 0.2 eV FWHM. This result is the best energy resolution that has been reported for any calorimetric detector. Although the sensor would saturate at x-ray energies, the ETF-TES microcalorimeter can be used as a high-efficiency, large-bandwidth optical photometer.

Detector 3 can also be used as a fast infrared bolometer, since it can operate at speeds 100 times faster than the thermal time constant of the system. The most important figures of merit for an infrared bolometer are its responsivity and noise equivalent power (NEP). For frequencies slower than the characteristic time constant of the system, the current responsivity of the ETF-TES is simply $S_1 \approx -1/V_{bias}$, where $V_{bias}$ is the voltage bias of the sensor. Detector 3 was operated with $V_{bias}$=0.5 $\mu$V, which yields a responsivity of $-2 \times 10^6$ A/W. The current noise from the device was 6 pA/$\sqrt{Hz}$, and was white from the 1/f knee of the SQUID to the thermal rolloff frequency (about 20 kHz). From the current noise and responsivity, the electrical NEP was $3 \times 10^{-18}$ W/$\sqrt{Hz}$. For this detector the measured thermal conductance to the cold finger was G=25 pW/K. This NEP is consistent with the thermal fluctuation noise associated with this G, $2.2 \times 10^{-18}$ W/$\sqrt{Hz}$, added in quadrature to the SQUID noise and Johnson noise from the bias circuit. The calculated electrical NEP is comparable to that of the most sensitive direct detector of infrared radiation, even though the thermal conductance is more than 10 times larger.

TABLE 1

Detector parameters and performance.

| Detector | Absorber | E | $\Delta E_{FWHM}$ | $\tau_{eff}$ |
|---|---|---|---|---|
| 1 | 250 μm × 250 μm × 2 μm Ag film | 4.5 keV x-ray | 14 eV | 480 μs |
| 2 | 250 μm × 250 μm × 0.5 μm Ag film | 1 keV heat pulse | 2.6 eV | 800 μs |
| 3 | 100 μm × 70 μm × 50 nm Ag/Al bilayer | 4 eV heat pulse | 0.2 eV | 8 μs |

We claim:

1. A particle detector adapted for cryogenic use, comprising:

a particle absorber; and a transition-edge sensor thermally coupled with said particle absorber, said transition-edge sensor comprising:
        a substrate;
        an aluminum/normal-metal bilayer disposed on said substrate, said bilayer comprising a first aluminum layer in contact with a first normal-metal layer, said bilayer having a superconducting state, a normal-conducting state and a transition region therebetween with transition temperature $T_c$; and
        a means for measuring superconducting transitions within said transition region.

2. The particle detector of claim 1 wherein said normal-metal layer is disposed on said substrate.

3. The particle detector of claim 1 wherein $T_c$<1 K.

4. The particle detector of claim 3 wherein $T_c$<150 mK.

5. The particle detector of claim 1 wherein said normal metal is selected from the group consisting of gold, silver, copper, palladium, platinum, gold/copper alloy and palladium/copper alloy.

6. The particle detector of claim 1 wherein said means for measuring superconducting transitions comprises a means for applying a voltage bias to said bilayer and a means for measuring current through said bilayer.

7. The particle detector of claim 6 wherein said means for applying a voltage bias further functions as a means for providing electrothermal feedback to said bilayer.

8. The particle detector of claim 6 further comprising a heat pulse generator coupled with said absorber.

9. The particle detector of claim 1 wherein said means for measuring a superconducting transition comprises a means for applying a current bias to said bilayer and a means for measuring the voltage across said bilayer.

10. The particle detector of claim 1 wherein said means for measuring superconducting transitions comprises a coil around said bilayer.

11. The particle detector of claim 1 wherein said particle absorber comprises a normal metal.

12. The particle detector of claim 1 wherein said particle absorber is positioned adjacent to and in electrical and thermal contact with said bilayer.

13. The particle detector of claim 1 wherein said particle absorber is disposed on said bilayer.

14. The particle detector of claim 1 further comprising a second normal-metal layer and a second aluminum layer, said second layers disposed on said first layers with alternating aluminum and normal-metal layers.

15. A method of detecting particles, comprising the steps of:

providing a transition-edge sensor comprising:
        a substrate;
        an aluminum/normal-metal bilayer disposed on said substrate, said bilayer comprising a first aluminum layer in contact with a first normal-metal layer, said bilayer having a superconducting state, a normal-conducting state and a transition region therebetween with transition temperature $T_c$; and
        a means for measuring superconducting transitions within said transition region;

maintaining the temperature of said bilayer within said transition region;

impinging a particle on said bilayer or on a particle absorber coupled with said bilayer;

measuring the resulting superconducting transition within said transition region of said bilayer; and detecting said particle from said measured superconducting transition.

16. The method of claim 15 wherein said means for measuring superconducting transitions comprises a means for applying a voltage bias to said bilayer and a means for measuring current through said bilayer.

17. The method of claim 16 wherein the step of maintaining the temperature of said bilayer comprises the steps of cooling said bilayer while applying said voltage bias to said bilayer, thereby providing electrothermal feedback.

18. The method of claim 17 wherein said particle is an x-ray and wherein 50 mK<$T_c$<150 mK.

19. The method of claim 18 wherein said particle absorber comprises a normal metal and wherein said particle absorber is positioned adjacent to and in electrical and thermal contact with said bilayer.

20. The method of claim 15 wherein said particles impinge on said bilayer.

21. The method of claim 20 wherein said bilayer is narrow and meandering in shape.

22. A thermometer for measuring temperature changes in an object, comprising:

a transition-edge sensor adapted to be thermally coupled with said object, said transition-edge sensor comprising:
        a substrate;
        an aluminum/normal-metal bilayer disposed on said substrate, said bilayer comprising a first aluminum layer in contact with a first normal-metal layer, said bilayer having a superconducting state, a normal-conducting state and a transition region therebetween with transition temperature $T_c$; and
        a means for measuring temperature changes in said object comprising a means for measuring superconducting transitions within said transition region.

23. The thermometer of claim 22 wherein said bilayer has a graded thickness.

24. A method for regulating the temperature of an object, comprising the steps of:

providing the thermometer of claim 22;

thermally coupling said object to said bilayer; and maintaining the temperature of said bilayer within said transition region by cooling said bilayer while applying a voltage to said bilayer, thereby providing electrothermal feedback.

25. The thermometer of claim 22 wherein said object is a particle absorber, whereby said thermometer detects particles striking said absorber.

26. A particle detector adapted for cryogenic use, comprising:
   a transition-edge sensor comprising:
      a substrate;
      an aluminum/normal-metal bilayer disposed on said substrate, said bilayer comprising a first aluminum layer in contact with a first normal-metal layer, said bilayer having a superconducting state, a normal-conducting state and a transition region therebetween with transition temperature Tc; and
      a means for measuring superconducting transitions within said transition region;
   wherein said substrate is a particle absorber.

27. The particle detector of claim 26 wherein said substrate is insulating or semiconducting.

28. A particle detector adapted for cryogenic use, comprising:
   a transition-edge sensor comprising:
      a substrate;
      an aluminum/normal-metal bilayer disposed on said substrate, said bilayer comprising a first aluminum layer in contact with a first normal-metal layer, said bilayer having a superconducting state, a normal-conducting state and a transition region therebetween with transition temperature Tc; and
      a means for measuring superconducting transitions within said transition region;
   wherein said bilayer is a particle absorber.

29. The particle detector of claim 28 wherein said bilayer is meandering in shape.

* * * * *